(12) United States Patent
Vander Jagt et al.

(10) Patent No.: US 7,633,050 B2
(45) Date of Patent: Dec. 15, 2009

(54) OPTICS ASSEMBLY FOR COLOR MEASUREMENT SYSTEM

(75) Inventors: Peter G. Vander Jagt, Belmont, MI (US); Ann Xiang, Waltham, MA (US); Kevin L. Behrens, Tiskilwa, IL (US); Gregory A. Williams, Grand Rapids, MI (US)

(73) Assignee: X-Rite, Inc., Grand Rapid, MI (US)

( * ) Notice: Subject to any disclaimer, the term of this patent is extended or adjusted under 35 U.S.C. 154(b) by 112 days.

(21) Appl. No.: 11/603,566

(22) Filed: Nov. 22, 2006

(65) Prior Publication Data

US 2007/0063131 A1 Mar. 22, 2007

Related U.S. Application Data

(62) Division of application No. 10/947,696, filed on Sep. 23, 2004, now abandoned.

(60) Provisional application No. 60/506,543, filed on Sep. 26, 2003.

(51) Int. Cl.
*G01J 3/50* (2006.01)
*H01J 5/16* (2006.01)
(52) U.S. Cl. ....................... 250/226; 356/402
(58) Field of Classification Search ................ 250/216, 250/239, 225; 359/238–258; 356/402–425
See application file for complete search history.

(56) References Cited

U.S. PATENT DOCUMENTS

| | | | |
|---|---|---|---|
| 5,003,500 A * | 3/1991 | Gerber | ......................... 356/319 |
| 5,028,134 A | 7/1991 | Bulpitt et al. | |
| 5,168,320 A | 12/1992 | Lutz et al. | |
| 5,892,585 A | 4/1999 | Lianza et al. | |
| 6,031,619 A | 2/2000 | Wilkens et al. | |
| 6,163,337 A | 12/2000 | Azuma et al. | |
| 6,459,485 B1 | 10/2002 | Tsurutani | |

(Continued)

FOREIGN PATENT DOCUMENTS

DE 199 50 176 A1 5/2001

(Continued)

OTHER PUBLICATIONS

X-Rite, Incorporated; Product Literature for DTP92 Monitor Optimizer; Dec. 1997.

(Continued)

*Primary Examiner*—Georgia Y Epps
*Assistant Examiner*—Tony Ko
(74) *Attorney, Agent, or Firm*—McCarter & English, LLP

(57) ABSTRACT

An optics assembly for a color measurement system. The optics assembly includes at least one light tube array and a polarization effect minimization element. The optics assembly includes a diffuser, a photocell separator, a precision filter and a second light tube array is provided substantially contained in a housing. The color measurement system includes a multi-purpose filter and the optics assembly. Segmented light is mixed and the polarization qualities of the light are modified so to minimize the effects caused by angular adjustments. A diffuser mixes the segmented light. Additionally, the color measurement system includes an ambient light attachment for collecting light from the viewing area surrounding the computer display. The ambient light collected is then analyzed, and a viewing area profile is created. The viewing area profile then can be used by software to adjust the colors displayed on the computer displays.

7 Claims, 7 Drawing Sheets

U.S. PATENT DOCUMENTS

| | | |
|---|---|---|
| 6,466,334 B1 | 10/2002 | Komiya et al. |
| 6,480,202 B1 | 11/2002 | Deguchi et al. |
| 6,492,635 B2 * | 12/2002 | Simchoni .................... 250/225 |
| 6,493,084 B1 | 12/2002 | Friend et al. |
| 6,590,648 B1 | 7/2003 | von Orelli et al. |
| 6,838,659 B2 | 1/2005 | Kanai |
| 7,145,645 B2 * | 12/2006 | Blumenfeld et al. .......... 356/73 |
| 2002/0159065 A1 | 10/2002 | Berstis |
| 2003/0058448 A1 | 3/2003 | Merle et al. |
| 2003/0151735 A1 * | 8/2003 | Blumenfeld et al. .......... 356/73 |
| 2005/0116942 A1 | 6/2005 | Vander Jagt et al. |

OTHER PUBLICATIONS

GretagMacBeth; Product Literature for Spectrolino Spectrophotometer; Mar. 1998.

Method of Creating A Color Profile For Color Measurement System, U.S. Appl. filed, Nov. 22, 2006.

http://www.generalphotonics.com/PolaMIX.htm.

http://www.halbo.com/depol.htm.

\* cited by examiner

OPTICS ASSEMBLY FOR COLOR MEASUREMENT SYSTEM

This application is a divisional application of U.S. patent application Ser. No. 10/947,696 filed Sep. 23. 2004 now abandoned, entitled "COLOR MEASUREMENT INSTRUMENT," which claims priority from provisional patent application Ser. No. 60/506,543, filed Sep. 26, 2003, entitled "COLOR MEASUREMENT INSTRUMENT," and this application is concurrently filed on Nov. 22, 2006 with U.S. patent application Ser. No. 11/603,661, entitled "METHOD OF CREATING A COLOR PROFILE FOR COLOR MEASUREMENT SYSTEM."

The present invention relates to color measurement instruments, and more particularly to color measurement instruments for computer displays.

Creation of visual presentations such as videos, movies and computer network publications, makes extensive use of computer workstation displays to control color. Instead of a single artisan laboring to create a presentation, several people working at different computer workstations collaborate to produce a visual presentation. These collaborative workflows allow the creation of complex visual presentations with color critical digital images in a relatively short time period. However, the creation of a single visual presentation by several people may result in inconsistent colors due to the presence of differing computer displays in the workflow. The final presentation also may not appear to the end user as the original creator had envisioned if the computer workstations do not have similar color mapping characteristics.

Because each computer display has different color characteristics and capabilities, colors displayed on one workstation may not appear identically on a different workstation. Thus, in a collaborative workflow, one artisan working on the same visual presentation may observe different colorization than a prior artisan. This could result in a misinterpretation of the visual presentation and ultimately result in an increased cost in the production of the visual presentation.

In order to increase the color consistency of computer displays and printers used in a work flow, the ICC (International Color Consortium) developed a standard method of describing the ability of a device to produce color. A computer readable file, generally referred to as an ICC compliant device profile, is created for each computer display. The ICC compliant device profile describes the color display abilities of the computer display, thus allowing for proper interpretation by the computer workstation's operating system architecture. When each color producing station in a design work flow is properly calibrated and further ICC profiled, color critical files may be exchanged across different computer workstations without misinterpretation of the original intended color design. The profile is then used by software programs to adjust the colorization of the computer display or printer in what is known as a "Color Managed" workflow. This workflow relates to the continuity of proper color generation and evaluation on displays (emissive, transmissive, or projected) from creation stages to final format.

Computer displays typically ship with a generic ICC profile created by the display manufacturer. The generic ICC profile describes the averaged performance of the display. However, as a computer display ages, the color display performance changes over time. Computer displays are connected to video controller cards, typically integrated into the workstation computer chassis. Like displays, each video controller has different video memory, resolution, and look-up-table (LUT) characteristics than other video controllers. Thus, the same computer display may display a color differently when driven by different video controllers.

To precisely describe the actual color behavior of the specific installation of workstation components, software and hardware devices are available to characterize the color performance of a computer display after installation and during use by a viewer. These hardware devices receive the color output emitting from the display. With the assistance of a software module, the devices calibrate and then characterize the color performance abilities of the display. This characterization saved as an ICC compliant computer file. The workstation operating system software uses this file to provide further adjustment of the colors rendered on this specific display.

The illumination of the target and the observer's viewing angle impacts color perception. As the robustness of color controlled workflows mature, the ambient illumination of the immediate area within a computer workstation becomes more important. The viewing conditions around a computer display affect the colors perceived by a viewer. For example, a viewer observing a picture on a computer display in a room illuminated by fluorescent lights will perceive colors differently than the same viewer observing the same picture on the same computer display in a room illuminated by incandescent lights. Current characterization devices fail to adequately compensate for these ambient viewing conditions. An ability to measure and then compensate for the ambient viewing conditions of a viewer is thus desirable.

Present computer displays in a workflow may utilize different technology. Two primary technology formats are CRT (cathode ray tube) and FPD (Flat Panel Display) monitors. The FPD may comprise liquid crystal display technology (LCD), or newer technologies such as Organic Light Emitting Diode (OLED) technology. The CRT's typically have a glass front, while the FPD's typically have a soft, damageable, and color performance degradable front surface by even the light pressure of a finger touch.

The CRT monitors produce color when an electron beam strikes a phosphor on a screen, causing the phosphor to glow. The light produced is unpolarized and generally omni-directional.

Light produced by FPD displays is different. In an LCD, red, green, and blue filters are together in a close formation for definition as a pixel. The trans-illumination comes from a back light behind a layer containing filters and liquid crystal pockets (for LCD technology). The liquid crystal, when energized in a row/column grid, creates a polarizing effect which serves as an optical light valve at the individual filter locations. The resultant light emitted by an LCD has directional qualities (angularly sensitive) and is polarized.

Thus, because of the differences in light produced by a CRT and a FPD with LCD technology, along with hard glass or soft front surfaces, the measurement device for color performance are optimized for each type of display technology.

The missing component to the human observer looking at a computer display, of any technology, is the controlled or compensated effect of the ambient illumination effect. Thus, a characterization device which is usable with LCD and CRT computer displays and which measures ambient light in the monitor's viewing area is highly desirable.

The precision of the filters used in the measurement device is critical to low cost and high quality. When filters corresponding to the wide band CIE 1931 Standard Observer are produced, small errors from the specified spectral profile for each filter must be compensated for. The compensations typically optimize the device for a single application—such as the phosphor type (e.g., P20) emission spectral profile of a CRT display but not for others.

U.S. Pat. No. 6,163,337 discusses the difficulties in achieving accurate colorimetry. U.S. Pat. No. 5,892,585 discusses a single calibration matrix which compensates for differences observed in CRT displays.

SUMMARY OF THE INVENTION

The aforementioned problems are overcome in the present invention.

A color measurement instrument is provided with an ambient sensor for detecting the colorization properties of light in the observation environment of the workstation. The ambient sensor could be removably attachable to the base of the instrument, or the ambient sensor could be integral with the top of the instrument enclosure. The ambient sensor records the light conditions within the room and transmits the data. Software uses the information derived from the color measurement device to adjust the white point and colors presented by the computer display. For example, the ICC profile could include data relating to the ambient viewing conditions of the computer display. A viewer would then more accurately observe the colors of a visual presentation.

For a design workstation where a controlled light booth is adjacent to the computer display, the ambient information for adaptation of the color on the computer display can be optimized in the same way the sample is viewed in the light booth under a known and controlled illuminate. Therefore, viewers within a visual presentation workflow observe the same color without regard to either computer display type or viewing conditions surrounding the computer display. This allows multiple locations to confidently view the resultant images or presentations on different display types, in different locations, and have the same visual viewing experience, thereby decreasing the misinterpretations, and improving the correlation between multiple location viewing.

Additionally, the color measurement instrument is designed for use with either an LCD computer display or a CRT computer display. Further, the color measurement instrument can be used for OLED, gas plasma, and projection based displays.

The color measurement instrument includes a filter and optics assembly for use by different types of computer displays. The filter and optics assembly has at least one tube array. The tube array contains a plurality of tubes for each channel. Each channel has a filter and a photodetector. In one embodiment, the tube array has five tubes per channel, although more or less tubes could be used. The tube arrays are equivalent to multiple apertures stacked in the optical path.

Multiple tubes per channel enable better cross channel mixing and greater signal strength. The configuration also allows for measurements of CRTs, FPDs, and ambient light conditions.

The tube arrays also allow for accurate measurement of the relatively narrow viewing angle for LCD displays. The variation of luminance and color properties for very narrow viewing angles (5.degree. to 10.degree.) from normal relate to the most stable and correlatable performance of the display technology. Viewing angles larger than 10.degree. contain measurably different luminance and calorimetric values, and thus are not desirable for critical color measurements.

For the optical design of the new device, light emerging from the tube array is allowed to mix naturally and this process may be assisted by adding a diffuser into the path. Material is also inserted in the path to optimize the overall system response in the presence of different polarization techniques that different display manufacturers employ (such as horizontal, radial, and vertical polarizing elements in the FPD). Preferably, the instrument is insensitive to polarized effects present in different display technologies. Minimizing the effect of polarization provides better repeatability and reproducibility of measurements when the instrument is placed in different orientations or locations on a display. A photocell separator divides the light into discrete areas for use by a photodetector. After the light passes through a precision filter, a photodetector and related circuitry converts the light into digital signals. An on-board microprocessor converts these signals into color numerical values, which then are transmitted to a host computer or application program.

These and other objects, advantages and features of the invention will be more readily understood and appreciated by reference to the detailed description of the drawings.

DETAILED DESCRIPTION OF THE DRAWINGS

Figure 1:
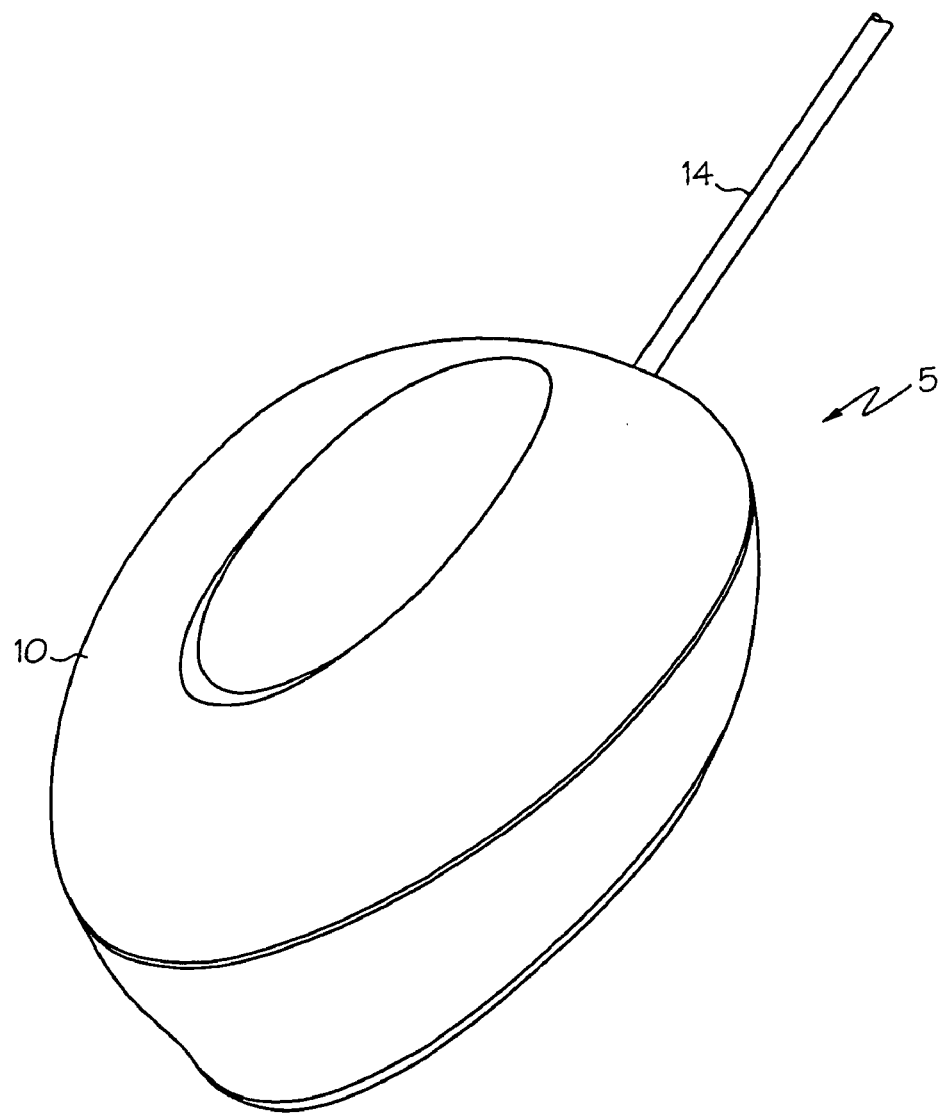
FIG. 1 is a top perspective view of a color measurement instrument.

FIG. 1 is a top view of color measurement instrument 5. Color measurement instrument 5 consists of a housing 10. Housing 10 has a first surface for placement adjacent to the display and a second surface spaced from the first surface that generally faces away from the display.

Communication interface 14 could be a USB (Universal Serial Bus) port, an RS-232 port, a firewire port, on any other port for communication of data to and from the color measurement system. Alternatively, color measurement instrument 5 could include a wireless transmission system, such as cellular, WIFI, or Bluetooth. A suitable communication system for a color measurement system is described in U.S. Pat. No. 6,493,084, which is hereby incorporated by reference.

Figure 2:
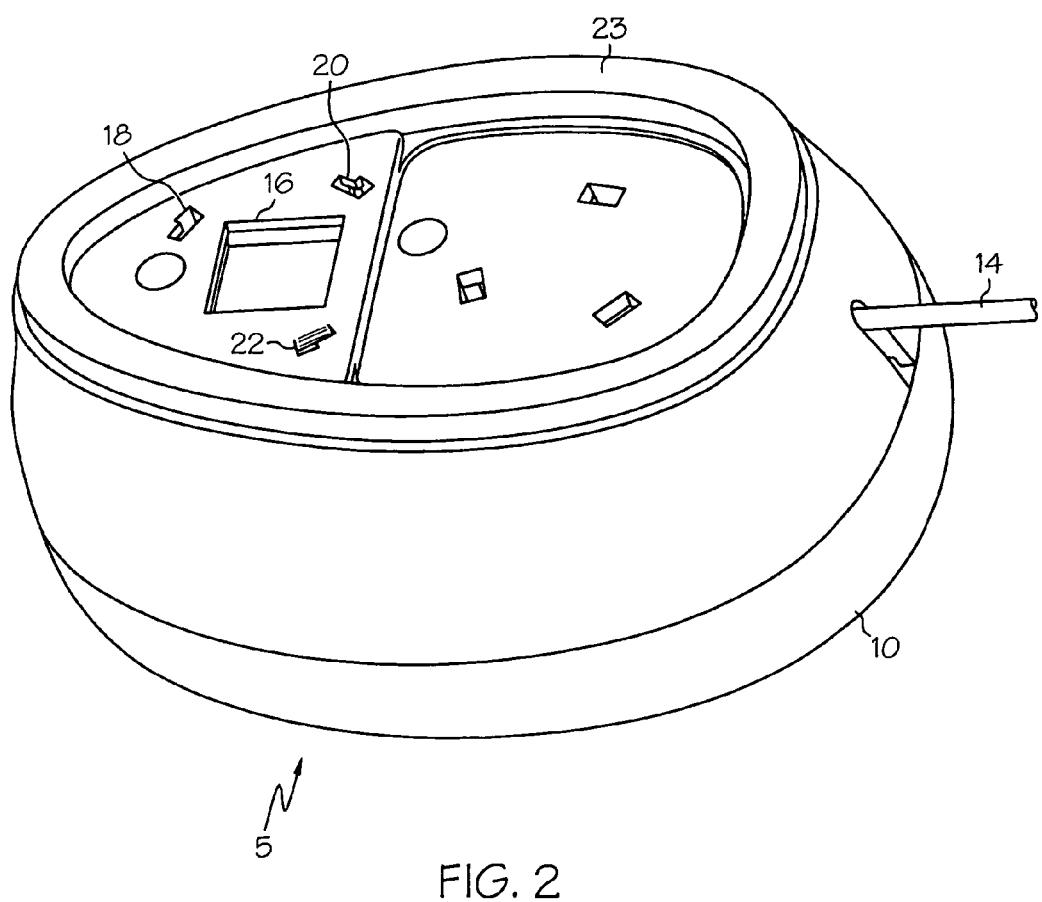
FIG. 2 is a bottom perspective view of a color measurement instrument.

FIG. 2 is a bottom view of color measurement instrument 5. On the base of color measurement instrument 5 is light receiver 16. Light receiver 16 allows light into color measurement instrument 5 for processing. Slots 18, 20, 22 allow for the connection of an ambient light attachment. The base of color measurement instrument 5 includes foam gasket 23. Gasket 23 is a non-marking, soft, feature that prevents damage to both LCD and CRT displays while maintaining the reference optical path reference. Gasket 23 is made of a resilient material. Gasket 23 forms a seal so that light other than from a display cannot enter light receiver 16. Further, gasket 23 generally maintains its shape so that the distance from the display surface to the light receiver is fixed and repeatable.

Figure 3:
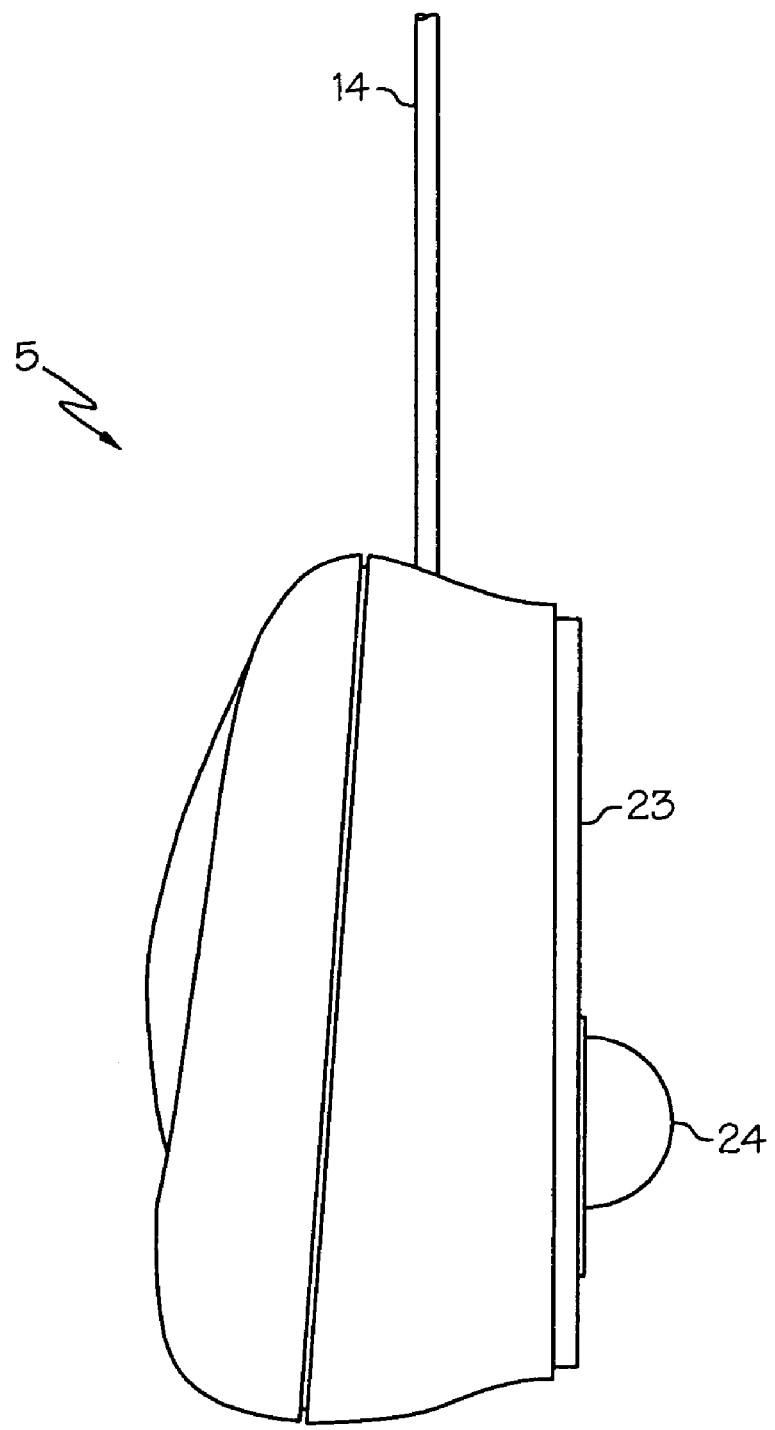
FIG. 3 is a side view of a color measurement instrument.

FIG. 3 is a side view of color measurement instrument 5. Ambient light attachment 24 is installed on the bottom of color measurement instrument 5. In this arrangement, color measurement instrument 5 receives light from a large area and focuses the received light on light receiver 16. Color measurement instrument 5 may automatically detect the presence of ambient light attachment 24. Alternatively, a user may actuate a button on color measurement instrument 5 to indicate the presence of ambient light attachment 24. And yet another alternative is to have the software detect the presence of ambient light attachment 24.

Ambient light attachment 24 is shown as generally hemispherical, but it could be flat or hemispherical. Ambient light attachment 25 is made of a translucent plastic or other suitable material. It acts as an angularly selective diffuser with cosine receptor qualities that allow a very directionally sensitive instrument to see light from all angles through the inlets of first tube assembly 52.

Color measurement instrument 5 thus operates in two modes. In the first mode, color measurement instrument 5 has a display light sensor. Light receiver 16 collects light from a computer display and color measurement instrument 5 analyzes the light from the computer display. In the second mode, when ambient light attachment 24 is in place, light receiver 16 collects light from a large area, such as a room. In this mode, color measurement instrument has an ambient light sensor. Color measurement instrument 5 analyzes the ambient light conditions surrounding the computer display, and provides the information by way of communication interface 14 to a software program installed on a remote computer for processing.

For example, a software program could use the ambient light information to change the ICC profile for the computer display by adding additional information to the ICC profile relating to the ambient lighting conditions. One embodiment utilizes this second mode for real-time updating of the active ICC profile or other correction algorithm/table data to automatically update the screen for real time ambient changes (clouds in the sky pass by, morning vs. evening sky influence, different room lighting, etc.) Color display programs used on the computer display could then access this information in the ICC profile to perform enhanced color correction. Alternatively, an ambient light profile or active correction enablement, similar to the ICC profile, could be created.

Ambient light attachment 24 allows color measurement instrument 5 to perform several different functions. First, color data from ambient light attachment 24 could be used to evaluate wide angle, averaged scene lighting for critical color viewing. For example, ambient light attachment 24 could be used to collect color data for trade show floors, workstations, medical diagnostic stations, in-store color and process control applications, or printing press control rooms. Second, color measurement instrument 5 could be used to evaluate the accuracy of a controlled light booth or custom lighting.

Additionally, color measurement instrument 5 could be used to evaluate the illumination of a reference color plane, such as a wall with a painted or projected color. Color measurement instrument 5 is used with a modified ambient light attachment containing additional optical elements such as lenses to facilitate light collection. Color measurement instrument 5 then collects color data regarding the reference color plane. Software utilizes the information to yield a correction table or an ICC profile, or both.

Figure 4:
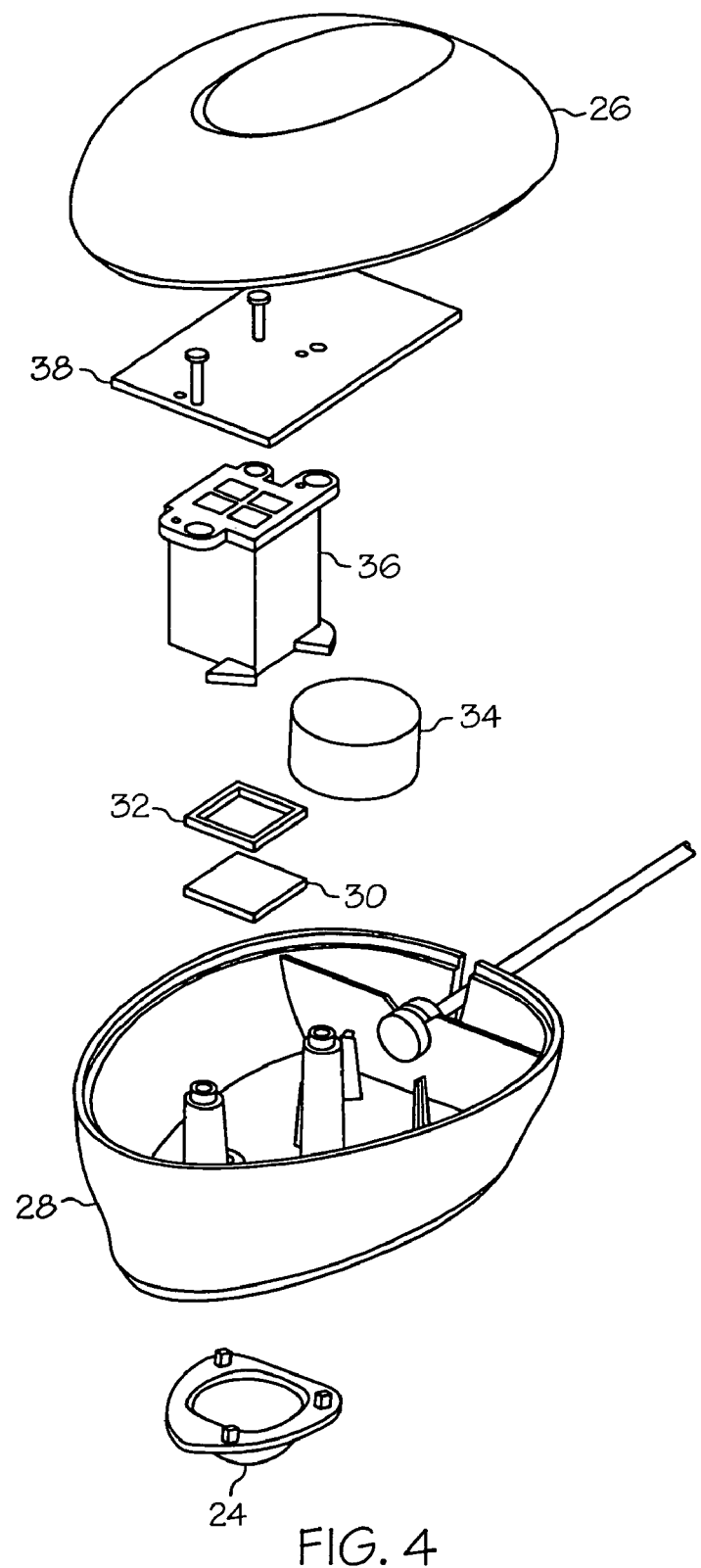
FIG. 4 is an exploded view of a color measurement instrument.

Because color measurement instrument 5 operates in a variety of different modes, a unique light collection arrangement is required. FIG. 4 is an exploded view of the color measurement instrument 5. Color measurement instrument 5 has a housing comprised of top 26 and base 28. As described above, ambient light attachment 24 is attachable to the bottom of base 28. IR blocking filter 30 is held in place in base 28 by gasket 32. Balance weight 34 resides within the housing.

Filter and optics assembly 36 is attached above gasket 32. Light passing through IR blocking filter 30 then enters filter and optics assembly 36. After passing through filter and optics assembly 36, it strikes light sensitive elements, such as light sensitive diodes on circuit board 38. Circuit board 38 then processes the signals, and in turn, communicates that information by way of communication interface 14 to a remote computer or other wireless connectivity.

Figure 5:
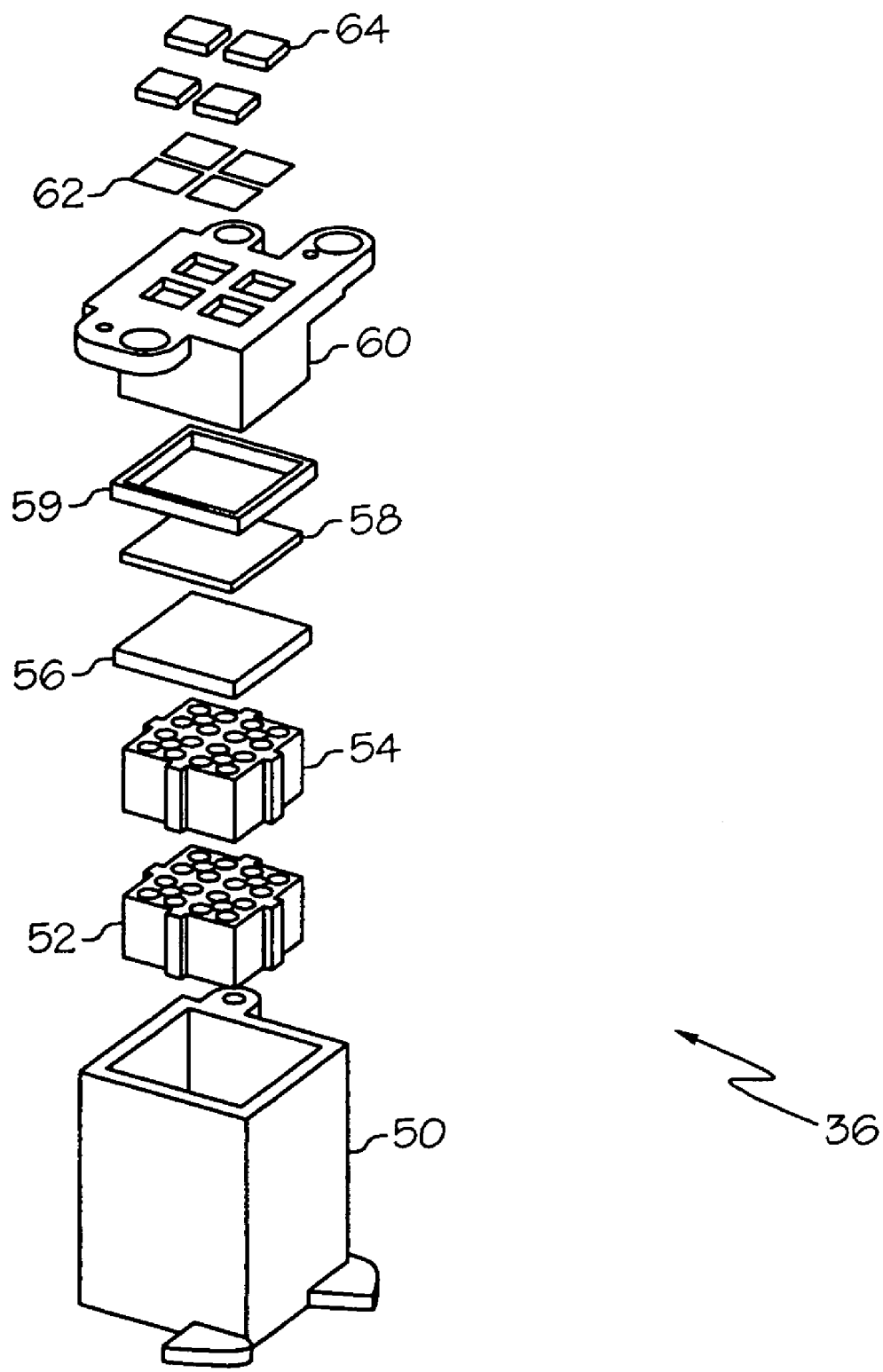
FIG. 5 is an exploded view of a filter and optics assembly contained within a color measurement instrument.

An exploded view of filter and optics assembly 36 is shown in FIG. 5. Filter and optics assembly 36 includes optics housing 50. Optics housing 50 contains a first light tube array 52 and a second light tube array 54. Light tube arrays 52, 54 contain several tubes for the light from discrete sections of computer display. Light is guided through first light tube array 52 and then through second light tube array 54. Light then passes through diffuser 56. Diffuser 56 mixes the light leaving second light tube array 54 so that the light is more generally representative of the light coming from the computer display. Gasket 59 holds diffuser 56 and polarization effect minimization element 58 in a desired position within filter and optics assembly 36.

After the light passes through polarization effect minimization element 58, light then passes through photocell separator 60. Photocell separator 60 partitions the light into dedicated, discrete areas for photodetector 64. Prior to entering photodetector 64, light is passed through the precision filter set 62. The precision filter set 62 renders the overall instrument response to conform to a CIE (International Commission on Illumination, Commission Internationale de l'Eclairage) 1931 filter. Precision filter 62 could, of course, be any of several other filters used for preconditioning light prior to color interpretation.

Photodetector 64 is attached to circuit board 38. Arrays of light sensitive diodes on circuit board 38 along with an analog-to-digital converter and a processor convert the light received by photodetector 64 into digital signals. The process for converting the light to digital signals is described generally in U.S. Pat. No. 6,493,084, assigned to the assignee of this patent application. The digital signals thus created could be transmitted to a remote computer by way of communication interface 14 or network interface.

This unique filter and optics assembly 36 allows color measurement system 5 to accurately measure color on FPD computer displays and CRT computer displays. Further, with ambient light attachment 24, color measurement system 5 can also accurately measure color for areas as large as a room. Additionally, the unique filter and optics assembly 36 is optimized for emerging display technology such as OLED, because of the cross coupling effect, which enables well blended light signals from a single pixel location to reach multiple channel detectors.

Figure 6:
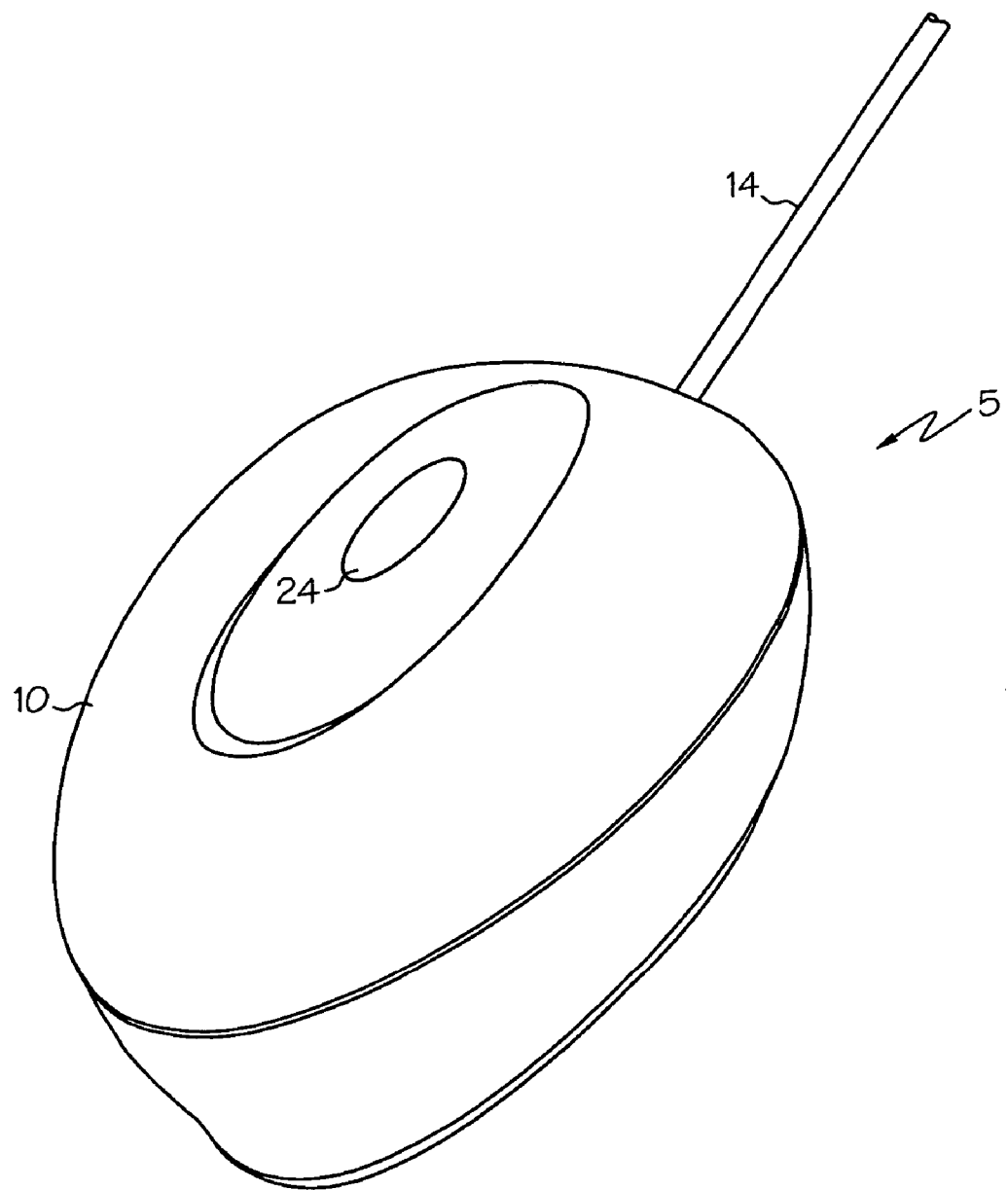
FIG. 6 is a top perspective view of a color measurement instrument with an ambient light attachment in the top of the instrument.
Figure 7:
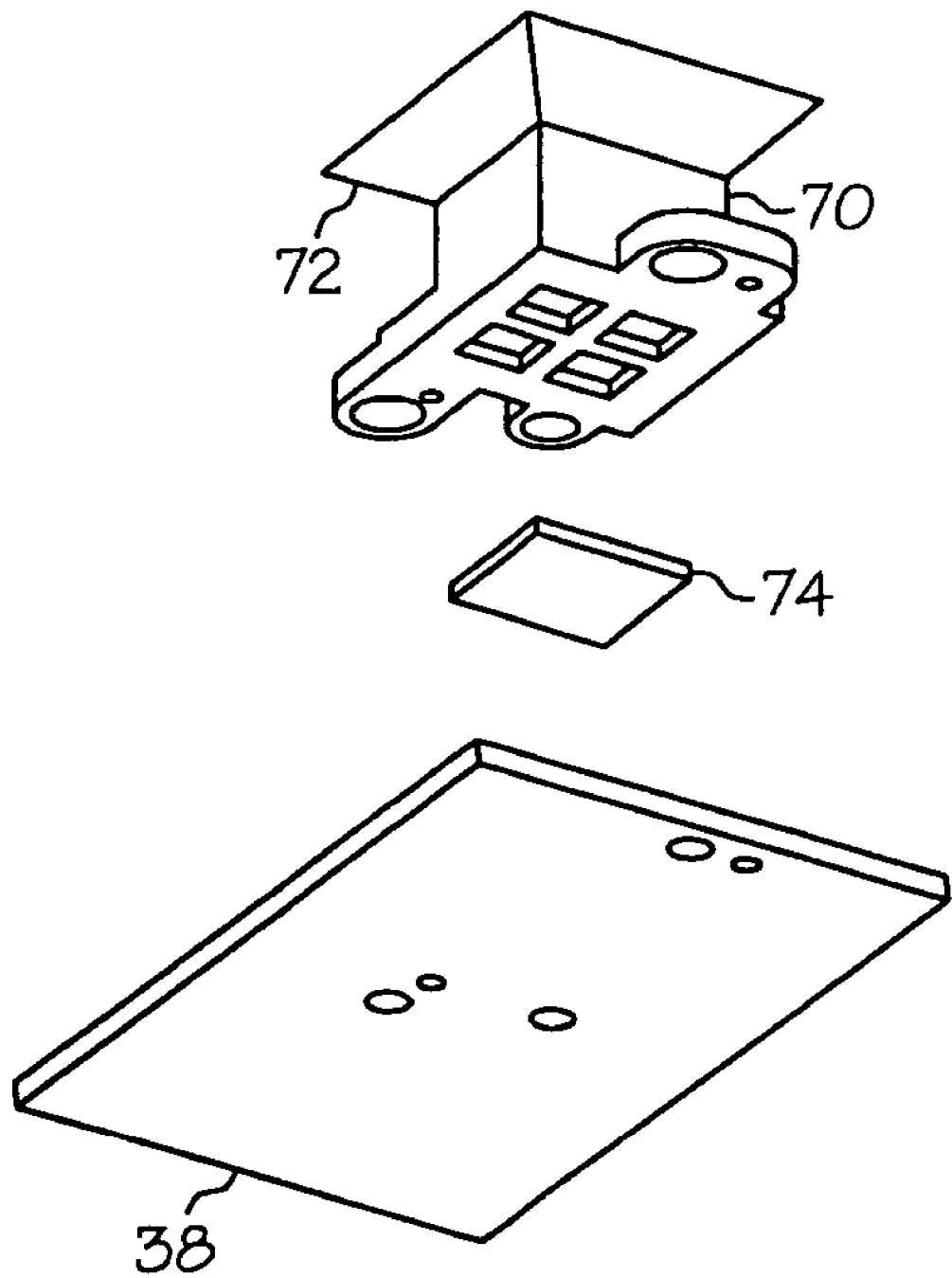
FIG. 7 is an exploded view of an optics assembly for the ambient light attachment in the color measurement instrument shown in FIG. 6.

An alternative arrangement for ambient light attachment 24 is shown in FIG. 6. In this arrangement, ambient light attachment 24 is located in the top surface of color measurement system 5. FIG. 7 shows an exploded view of the optical arrangement for processing the light captured by ambient light attachment 24. Light would first pass through ambient light photocell separator 70 before striking ambient photodetectors 74. Ambient light photocell separator 70 is similar to photocell separator 60 except for the addition of cowl 72. Cowl 72 attaches closely to the top of housing 10. Cowl 72 prevents light from sources other than ambient light attachment 24 from entering the main body of ambient light photocell separator 70.

Ambient detector 74 could be one of several devices. Ambient detector 74 could be an array of photodetectors, a CIE calorimeter filters or a multiband spectral sensor. Ambient detector 74 could be attached to circuitry to convert the light into digital signals by a process similar to that disclosed in U.S. Pat. No. 6,493,084, assigned to the assignee of this patent application. Digital signals representative of the ambient light would then be transmitted to a remote computer by way of communication interface 14.

Obviously, because the ambient light sensor is integral with color measurement system 5, a user would not need to use any attachments and thus the general convenience and usability of the device is enhanced. However, the presence of ambient light sensor on the top of color measurement system 5 presents several additional opportunities.

Adding active ambient light measurement capability to be integral with other color measurement devices (such as densitometers, calorimeters, and spectrophotometers and cameras) has added functional value beyond display measurement control. Devices that can incorporate this may be optimized for measurement of reflective or transmissive readings. These other instruments or optical-electrical sub-assemblies may perform the dual role of calibration or characterization of printers and printed output, as well as ink, coatings, and paint, in a color controlled work flow in addition to active ambient sensing.

Color measurement system 5 could continually process the ambient light surrounding the work station. Thus, a better model of the color conditions around the work station could be constructed, allowing for better color management by the computer display. Statistical and trend information regarding light and color could be reported to a central computer for processing. Further, color measurement system 5 could continually monitor light from other sources surrounding the work station.

The collected data could then be used for customer reporting or ISO documentation of work station process control. The data could also be utilized for other home or office automation features which are triggered by specific different parameters of environment lighting, such as luminance or colorimetrics.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. An optics assembly associated with a color measurement instrument, the optics assembly comprising:
    a first light tube array that provides angular constraint to light received by the color measurement instrument, said annular constraint defining a limited range of measurement angles for the color measurement instrument; and
    a polarization effect minimization element that modifies polarization qualities of the light received by the color measurement instrument, said modifications reducing the polarization sensitivity of the color measurement instrument.

2. The optics assembly of claim 1 further comprising a diffuser that is adapted to mix the light received by the color measurement instrument before said light received by the color measurement instrument enters the polarization effect minimization element.

3. The optics assembly of claim 1 further comprising a photocell separator.

4. The optics assembly of claim 1 further comprising a precision filter.

5. The optics assembly of claim 1 further comprising a second light tube array.

6. The optics assembly of claim 1 further comprising:
    a diffuser,
    a photocell separator,
    a precision filter,
    a second light tube array, and
    a housing,
    wherein the housing is configured and dimensioned to substantially contain the first and second light tube arrays, the polarization effect minimization element, the diffuser, the photocell separator, and the precision filter.

7. An optics assembly positioned within a color measurement instrument, the optics assembly comprising:
    a light tube array including a plurality of light tubes, each light tube configured to receive light from a discrete region of a target area, said light tube array providing angular constraint to light received by the color measurement instrument, said angular constraint defining a limited range of measurement angles for the color measurement instrument; and
    a polarization effect minimization element that modifies polarization qualities of the light received by the color measurement instrument, said modifications reducing the polarization sensitivity of the color measurement instrument.

* * * * *